United States Patent
Bachhuber

(10) Patent No.: US 8,624,498 B2
(45) Date of Patent: Jan. 7, 2014

(54) METHOD FOR CONTROLLING A LIGHTING SYSTEM IN AN AIRCRAFT CABIN

(75) Inventor: Martin Bachhuber, Altdorf (DE)

(73) Assignee: Diehl Aerospace GmbH, Ueberlingen (DE)

( * ) Notice: Subject to any disclaimer, the term of this patent is extended or adjusted under 35 U.S.C. 154(b) by 297 days.

(21) Appl. No.: 13/088,662

(22) Filed: Apr. 18, 2011

(65) Prior Publication Data

US 2011/0254445 A1    Oct. 20, 2011

(30) Foreign Application Priority Data

Apr. 20, 2010 (DE) .......................... 10 2010 015 518

(51) Int. Cl.
- *B60Q 1/14* (2006.01)
- *B60Q 1/00* (2006.01)
- *B60Q 3/00* (2006.01)
- *B60Q 1/124* (2006.01)
- *H01K 7/00* (2006.01)

(52) U.S. Cl.
USPC ............... 315/77; 315/76; 363/233; 363/459; 363/488

(58) Field of Classification Search
USPC ................ 315/76, 77, 82, 291; 362/227, 231
See application file for complete search history.

(56) References Cited

U.S. PATENT DOCUMENTS

| | | | |
|---|---|---|---|
| 6,501,441 B1 | 12/2002 | Ludtke et al. | |
| 7,332,877 B2 * | 2/2008 | Crodian et al. | 315/297 |
| 7,508,141 B2 * | 3/2009 | Wong | 315/185 S |
| 7,515,128 B2 * | 4/2009 | Dowling | 345/83 |
| 8,258,702 B2 * | 9/2012 | Zielinski et al. | 315/77 |
| 8,400,061 B2 * | 3/2013 | Kuang et al. | 315/77 |
| 2002/0171378 A1 * | 11/2002 | Morgan et al. | 315/291 |
| 2003/0057886 A1 * | 3/2003 | Lys et al. | 315/291 |
| 2005/0111231 A1 | 5/2005 | Crodian et al. | |
| 2007/0153514 A1 * | 7/2007 | Dowling et al. | 362/231 |
| 2007/0217209 A1 | 9/2007 | Wong | |
| 2008/0297068 A1 | 12/2008 | Koren et al. | |
| 2009/0122532 A1 | 5/2009 | Schevardo et al. | |

FOREIGN PATENT DOCUMENTS

| | | | |
|---|---|---|---|
| EP | 1 337 784 B1 | 6/2009 | |
| EP | 2 107 857 A2 | 10/2009 | |

\* cited by examiner

*Primary Examiner* — Shawki Ismail
*Assistant Examiner* — Dylan White
(74) *Attorney, Agent, or Firm* — Scully, Scott, Murphy & Presser, P.C.

(57) ABSTRACT

A method for controlling a lighting system in an aircraft cabin is provided. The lighting system has lighting units each including a controller for controlling RGB light-emitting diodes, and a central processor connected to each controller for data exchange. Each controller has a storage unit for storing scene programs each controlling a respective scene. Control data records are transmitted to the controllers from the central processor for controlling an overall luminous behavior generated by the lighting units. The control data records have scene program identification information and synchronization information for controlling the sequence of the scene program corresponding to the scene program identification information with time.

10 Claims, 1 Drawing Sheet

Fig. 1
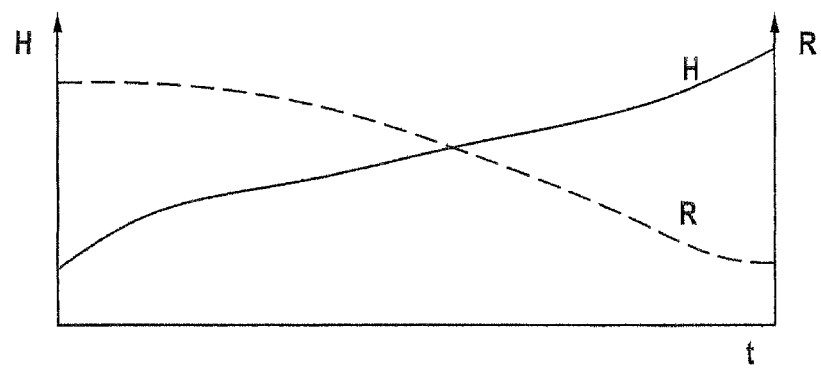
Fig. 2
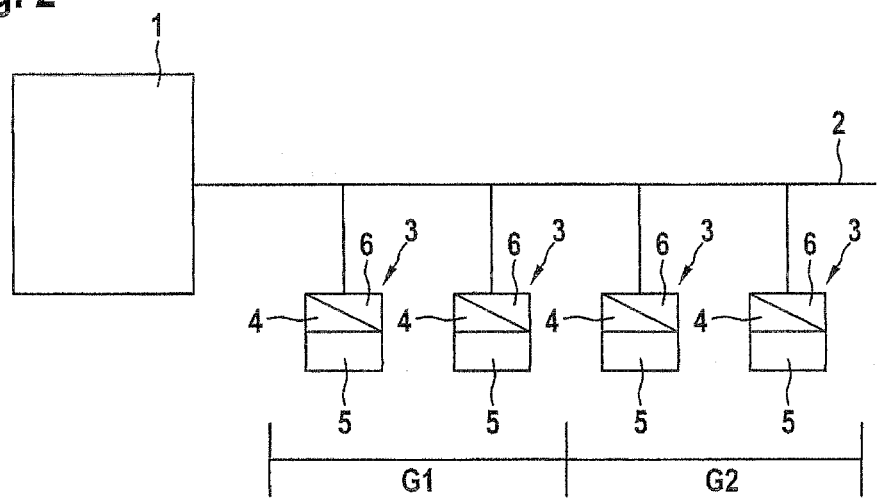
Fig. 3
| Ra |
|----|
| P I |
| S I |
| P |
| Ra |

METHOD FOR CONTROLLING A LIGHTING SYSTEM IN AN AIRCRAFT CABIN

BACKGROUND

The invention relates to a method for controlling a lighting system in an aircraft cabin.

According to the prior art, a lighting system for an aircraft cabin is generally known which comprises a multiplicity of lighting units arranged distributed in the aircraft cabin. Each of the lighting units consists of a controller and a multiplicity of RGB light-emitting diodes connected thereto. The controllers are connected to a central processor via a bus. In the central processor, a number of so-called "scene programmes" are stored. The "scene programmes" contain arithmetic instructions for continuously generating parameters which are transmitted to the controllers via the bus. On the basis of these parameters, for example, the brightness and/or the colour of the light generated by means of the RGB light-emitting diodes is changed with time by means of the controllers. This results in luminous scenarios or scenes. Such scenes can simulate, for example, a sunrise or a sunset. Furthermore, scenes can be created which have a calming or a stimulating effect on passengers.

In particular, aircraft cabins of modern wide-bodied aircraft require the provision of a lighting system having a relatively large number of lighting units. In this case, processing the respective scene programmes requires the transmission of a relatively high data rate via the bus. This, in turn, leads undesirably to a reduction in the speed of the data exchange via the bus. This is undesirable especially with regard to other control data to be transmitted via the bus, especially control data relating to flight safety.

SUMMARY

It is the object of the invention to eliminate the disadvantages according to the prior art. In particular, a method is to be specified by means of which a data rate for controlling a lighting system in an aircraft cabin can be reduced. According to another aim of the invention, it should be possible to execute the method without significant change in the hardware currently used for manufacturing the lighting system.

As determined by the invention, a method for controlling a lighting system in an aircraft cabin with a multiplicity of lighting units arranged distributed in the aircraft cabin is proposed, each of which comprises a controller for controlling RGB light-emitting diodes connected thereto,
and a central processor connected to each of the controllers for the purpose of data exchange,
each controller comprising a storage unit having a number of scene programmes stored therein for controlling in each case one scene, a scene being a predetermined change with time of a luminous behaviour of the RGB light-emitting diodes, and control data records being transmitted to the controllers from the central processor for controlling an overall luminous behaviour generated by means of the multiplicity of lighting units, each of which control data records contains at least one scene programme identification information item and one synchronization information item for controlling the sequence of the scene programme corresponding to the scene programme identification information with time.

Since, according to the invention, the scene programmes are now provided in the controllers, the data rate required for controlling the lighting system can be drastically reduced. It is now only required to select and, for example, to start one of the scene programmes stored in the storage units by means of control data records transmitted to the controllers from the central processor in accordance with the scene programme identification information transmitted therewith. To ensure a synchronous sequence of all scene programmes, the control data record also contains synchronization information. This synchronization information is continuously updated by the central processor. By repeatedly transmitting the control data records, synchronous processing of the scene programmes by means of the controllers can thus be ensured. Thus, the central processor now only transmits a programme selection or scene programme identification information and synchronization information via the bus for controlling the scene programmes. In comparison with previous methods, the repetitive transmission of the control data records can occur within relatively long time intervals so that loading of the bus can thus also be reduced.

According to an advantageous embodiment, the control data record comprises a scene programme speed information for controlling a speed of a sequence of the scene generated by means of the scene programme. By this means, a predetermined speed of the sequence of the scene programme can be increased or reduced depending on requirement.

It is also possible that the control data record comprises a brightness information for controlling a brightness of the scene generated by means of the scene programme. By this means, a brightness of the scene running in each case can be increased or decreased overall. In particular, a scene programme speed information and/or a brightness information can also be generated in particular by a manual input by the cabin personnel. The cabin personnel are thus able to adapt the overall luminous behaviour of the lighting system to specific requirements at any time.

According to an advantageous embodiment of the invention, the lighting systems are split into at least two groups. In this case, the control data record can contain a synchronization information item specific for each of the groups. The aforementioned groups can be combined in particular cabin sections. For example, a front cabin section can form a first group and a rear cabin section can form a second group of lighting units. The specific synchronization information provided for each of the groups can be different. Thus, a scene programme can be processed offset with time in the two groups. For example, the processing of a scene programme in the first group can lead the processing of the scene programme in the second group.

It can also be that the control data record contains a scene programme identification information item specific for each of the groups. It is thus possible to process a different scene programme in each of the groups.

In a "standard mode", the control data records are continuously newly generated by the central processor in accordance with a predetermined algorithm and are transmitted to the controllers at predetermined time intervals. This ensures faultless and synchronous sequence of the respective scene programmes. Even if an execution of one of the scene programmes is faulty, it can be restarted by the continuously recurring control data records and processed synchronously with the other scene programmes.

A content of the control data records can be changed by means of manually input control information. Such control information can stand the brightness or the selection of a particular scene programme. For example, a scene programme provided for emergency cases can be activated by this means.

The control data records are advantageously transmitted to the controllers at time intervals of 100 to 300 ms, preferably 150 to 250 ms. By this means, the loading of a bus connecting the controllers to the central processor can be reduced.

According to a further, particularly advantageous embodiment of the invention, at least one scene programme is transmitted to the controllers from the central processor in an "update mode". Such an update mode can then be activated when the loading of the bus is low, for example when the aircraft is standing on the ground. Such time intervals can be used, e.g., for updating scene programmes.

BRIEF DESCRIPTION OF THE DRAWINGS

In the text which follows, an illustrative embodiment of the invention is explained in greater detail with reference to the drawings, in which:

FIG. 1 shows the variation of brightness and colour of a scene over time,

FIG. 2 shows a diagrammatic view of a lighting system and

FIG. 3 shows the structure of a control data record.

DETAILED DESCRIPTION OF EXEMPLARY EMBODIMENTS

FIG. 1 shows by way of example the variation of brightness H and of colour of a scene over time. As can be seen from FIG. 1, the brightness H increases whereas the red component R of the colour decreases.

FIG. 2 shows the diagrammatic structure of a lighting system. The lighting system comprises a central processor 1 to which a multiplicity of lighting units 3 are connected via a bus 2. Each of the lighting units 3 comprises a controller 4 for controlling RGB light-emitting diodes 5 connected thereto. Furthermore, the controller 4 comprises a storage unit 6 in which a number of scene programmes (not shown here) are stored.

The reference symbol G1 designates a first group of lighting units 3 and the reference symbol G2 designates a second group of lighting units 3.

FIG. 3 diagrammatically shows the structure of a control data record. The control data record comprises a data frame Ra which contains a scene programme identification information item PI and a synchronization information item SI. Furthermore, at least one more parameter P may optionally be contained. This can be, for example, a brightness or a scene programme speed information item.

The lighting system has the following function:

Each of the lighting units contains a number of scene programmes P1, P2, P3 in the storage unit 6. Each of the scene programmes P1, P2, P3 in turn comprises a calculation rule for calculating brightness and/or colour values on the basis of which the controller 4 drives the RGB light-emitting diodes 5. In dependence on the respective scene programme P1, P2, P3, each lighting unit 3 generates a predetermined changing light impression over time.

The start and/or the synchronous sequence of the scene programmes P1, P2, P3 contained in the lighting units 3 is controlled by a repetitive transmission of control files via the bus 2 to the controller 4. The control files are generated by the central processor 1 in accordance with a predetermined algorithm and transmitted, for example, at time intervals of 200 ms to the controllers 4. Each control file comprises a scene programme identification information item PI in which the scene programme P1, P2, P3 to be started in each case or running is addressed. Furthermore, the control file comprises a synchronization information item SI which specifies a programme progression for the respective scene programme P1, P2, P3. This makes it possible to ensure that all scene programmes P1, P2, P3 running within a group G1, G2 have the same programme progression, i.e. there will be no different luminous behaviour of the lighting units contained in a group G1, G2.

Moreover, each of the lighting units 3 can be provided with a specific identifier. A number of lighting units 3 can be combined to form groups G1, G2 on the basis of their specific identifier. In this case, the control data record can additionally contain an identifier information item which provides for its transmission precisely to the lighting unit 3 having the specific identifier corresponding to the identifier information. This makes it possible to generate a specific control data record for each of the lighting units 3 and to transmit it precisely to the lighting unit 3 provided for it. In this manner, groups G1, G2 of lighting units can be formed which receive different control data records. For example, a first scene programme P1 can be started in a first group G1 and a second scene programme P2 can be started in a second group G2. However, it is also possible to start the same scene programme P1, P2, P3 in the two groups G1, G2 but to transmit a different synchronization signal SI to the lighting units 3 of the groups G1, G2. In this manner, a time offset of the scene programme P1, P2, P3 running in the groups G1, G2 can be achieved, for example.

Using manual inputs, it is also possible to change a parameter P in the control data record by means of which, for example, the brightness and/or the sequence speed of the scene programmes P1, P2, P3 can be changed with respect to the previous settings predetermined in the scene programme P1, P2, P3.

Since the control data records contain relatively little information and are only transmitted at time intervals of, for example, 200 ms via the bus 2, the loading of the bus 2 can be kept relatively low, i.e. the bus 2 has in this case sufficient capacity for transmitting other control data which, for example, are used for monitoring and/or controlling essential components of an aircraft during flight.

By means of the present method, it is possible to transmit update information from the central processor 1 via the bus 2 to the controllers 4 at operating times with little bus loading 2, for example when an aircraft is at a standstill. These can be changed scene programmes or the like.

LIST OF REFERENCE DESIGNATIONS

1 Central processor
2 Bus
3 Lighting unit
4 Controller
5 RGB light-emitting diode
6 Storage unit
G1 First group
G2 Second group
H Brightness
P Parameter
PI Scene programme identification information
P1, P2, P3 Scene programme
R Red value
Ra Frame
SI Synchronization information

The invention claimed is:

1. A method for controlling a lighting system in an aircraft cabin, the lighting system comprising a plurality of lighting units arranged in the aircraft cabin, each of the lighting units comprising a controller for controlling RGB light-emitting diodes connected to the controller, the lighting system further comprising a central processor connected to each of the controllers for data exchange, each controller comprising a storage unit storing a plurality of scene programs each for controlling a respective scene, which respective scene comprises a predetermined change with time of a luminous behavior of the RGB light-emitting diodes, wherein the lighting system is connected to a data bus, the method comprising: transmitting a plurality of control data records between the controllers and the central processor via the data bus for controlling an overall luminous behavior generated by the lighting units, each of the control data records comprising at least one scene program identification information item and at least one synchronization information item for controlling the sequence of the scene program corresponding to the scene program identification information with time, wherein, to reduce the data load of the data bus, the scene programs are transferred from the central processor to the controller via the data bus in a special update mode phase.

2. The method according to claim 1, wherein the control data record comprises a scene program speed information for controlling a speed of a sequence of the scene generated by the scene program.

3. The method according to claim 1 or claim 2, wherein the control data record comprises a brightness information for controlling a brightness of the scene generated by the scene program.

4. The method according to claim 3, wherein the lighting units are split into at least two groups and the control data record comprises a synchronization information item specific for each of the groups.

5. The method according to claim 4, wherein the control data record comprises a scene program identification information item specific for each of the groups.

6. The method according to claim 3, wherein the control data records are continuously newly generated by the central processor in accordance with a predetermined algorithm and are transmitted to the controllers at predetermined time intervals.

7. The method according to claim 3, wherein a content of the control data records are changeable by manually input control information.

8. The method according to claim 3, wherein the control data records are transmitted to the controllers at time intervals of 100 to 300 ms.

9. The method according to claim 8, wherein the control data records are transmitted to the controllers at time intervals of 150 to 250 ms.

10. The method according to claim 3, wherein at least one scene program is transmitted to the controllers from the central processor in an update mode.

* * * * *